(12) United States Patent
Graham et al.

(10) Patent No.: US 9,551,242 B2
(45) Date of Patent: Jan. 24, 2017

(54) ROCKER ARM FOR ENGINES

(71) Applicant: Caterpillar Inc., Peoria, IL (US)

(72) Inventors: Curtis J. Graham, Peoria, IL (US); Jonathan R. Eggemeyer, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 110 days.

(21) Appl. No.: 14/551,525

(22) Filed: Nov. 24, 2014

(65) Prior Publication Data

US 2016/0146063 A1    May 26, 2016

(51) Int. Cl.
    *F01L 1/18*          (2006.01)
    *F01L 1/46*          (2006.01)
    *B23P 6/00*         (2006.01)

(52) U.S. Cl.
    CPC ............... *F01L 1/181* (2013.01); *B23P 6/00* (2013.01); *F01L 1/46* (2013.01)

(58) Field of Classification Search
    CPC ............... F01L 1/181; F01L 1/46; B23P 15/00
    See application file for complete search history.

(56) References Cited

U.S. PATENT DOCUMENTS

| | | | |
|---|---|---|---|
| 2,561,433 A * | 7/1951 | Uhle | ............... B29D 1/00 351/140 |
| 3,750,259 A | 8/1973 | Timmons | |
| 6,382,893 B1 | 5/2002 | Reed | |
| 7,802,350 B2 | 9/2010 | Walker | |
| 8,601,663 B2 | 12/2013 | Ngo et al. | |
| 8,689,762 B2 | 4/2014 | Bach et al. | |
| 2008/0257293 A1* | 10/2008 | Fasanotto | ............... F01L 1/146 123/90.36 |

\* cited by examiner

*Primary Examiner* — Zelalem Eshete
(74) *Attorney, Agent, or Firm* — Jonathan Yates

(57) ABSTRACT

A method for repairing a rocker arm including smoothing out a bore in an injector arm of the rocker arm to remove at least a portion of worn threads within the bore, and securing a threaded insert within the bore. The threaded insert may include threads on an internal surface of the threaded insert, a smooth portion on an external surface of the threaded insert, and a flange on an end of the threaded insert.

12 Claims, 4 Drawing Sheets

ROCKER ARM FOR ENGINES

TECHNICAL FIELD

The present disclosure relates generally to a rocker arm and more specifically a rocker arm for engines.

BACKGROUND

Rocker arm assemblies for an internal combustion engine pivot about a fixed point, thereby displacing a valve of the internal combustion engine. The rocker arm can be considered part of a valve train of the internal combustion engine, which may be disposed within a cylinder head of the engine. The valve train also includes valves, springs and camshafts. The rocker arm can also include an injection arm with threads located in the injection arm. However, the threads of the injection arm can wear out over time.

U.S. Pat. No. 8,601,663 ('663 Patent) discloses methods for structurally repairing a component having a damaged internally threaded opening. The damaged internally threaded opening is machined to a predetermined diameter, thereby forming a machined opening. At least one notch is formed in the machined opening, thereby forming a notched opening. A selected amount of repair material is cold sprayed into the notched opening, including into the at least one notch. A plurality of internal threads are formed from the repair material to form a repaired internally threaded opening in the component. However, spraying repair material may be undesirable from a cost or manufacturing perspective.

The system and method of the present disclosure solves one or more problems set forth above and/or other problems in the art.

SUMMARY

In one aspect, the present disclosure is directed to a method for repairing a rocker arm including smoothing out a bore in an injector arm of the rocker arm to remove at least a portion of worn threads within the bore, and securing a threaded insert within the bore. The threaded insert may include threads on an internal surface of the threaded insert, a smooth portion on an external surface of the threaded insert, and a flange on an end of the threaded insert.

In another aspect, the present disclosure is directed to a rocker arm including an injector arm defining a smoothed out bore, and a threaded insert located within the bore. The threaded insert may include threads on an internal surface of the threaded insert, a smooth portion on an external surface of the threaded insert, and a flange on an end of the threaded insert.

In another aspect, the present disclosure is directed to a method for making a rocker arm including smoothing out a bore in an injector arm and securing a threaded insert within the bore. The threaded insert may include threads on an internal surface of the threaded insert, a smooth portion on an external surface of the threaded insert, and a flange on an end of the threaded insert.

DETAILED DESCRIPTION

Figure 1:
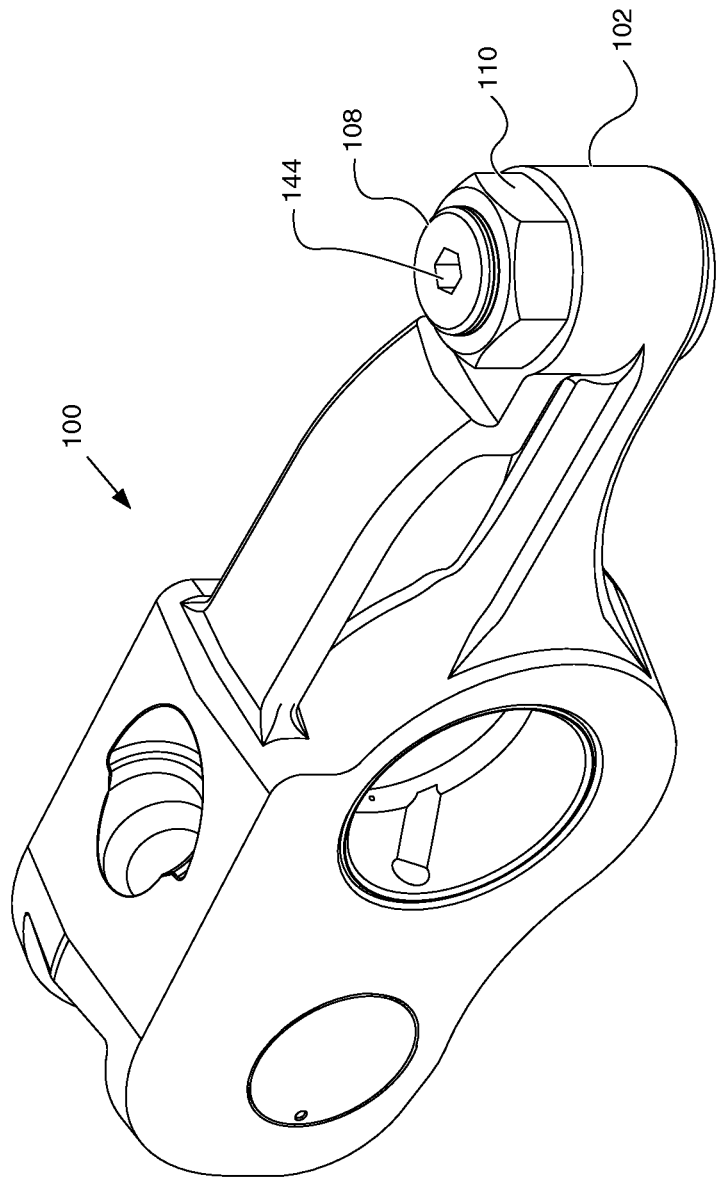
FIG. 1 depicts a rocker arm according to an embodiment.
Figure 2:
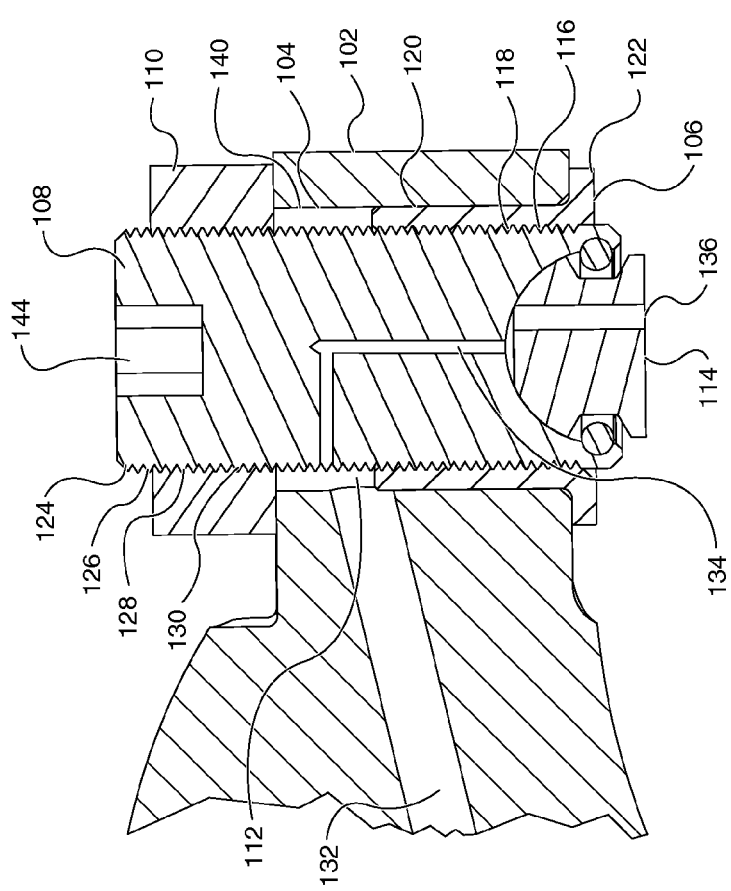
FIG. 2 depicts a partial sectional view of a rocker arm according to an embodiment.

FIG. 1 depicts a repaired rocker arm 100 including an injector arm 102. FIG. 2 depicts a partial sectional view of the injector arm 102. As can be seen in FIGS. 1 and 2, the injector arm 102 includes a bore 104. The bore 104 can be smoothed out, which will be described in more detail below. The rocker arm 100 can also include a threaded insert 106, an adjusting screw 108, and a jam nut 110. Optionally, the rocker arm can also include a button 114. The button 114 can be configured to connect to a valve in an engine.

The rocker arm 100 may be a component of an internal combustion engine. In an embodiment, the engine may include an internal combustion engine. The engine can also be located within or utilized for a machine including, for example, a wheel loader, an off-highway truck, a tractor, and a generator set. In an embodiment, the engine can utilize gasoline, diesel, natural gas, or any combination thereof as a fluid combustion source.

Figure 3:
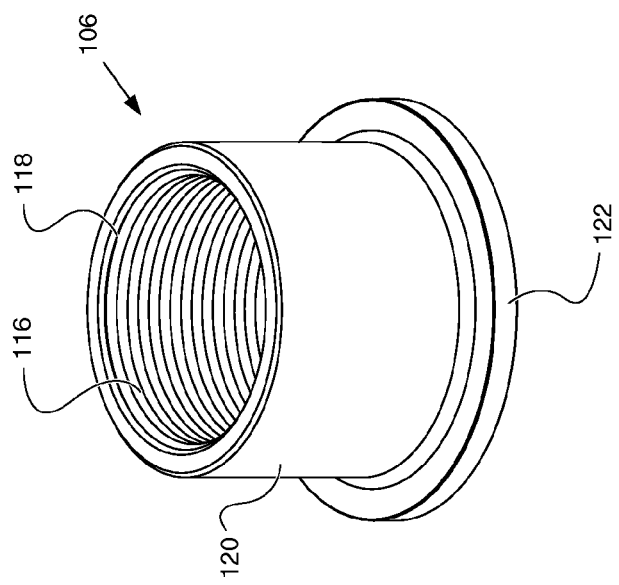
FIG. 3 depicts a threaded insert according to an embodiment.

As seen in FIGS. 2 and 3, the threaded insert 106 may have a body 107 that is generally cylindrical in shape and includes an internal surface 118 that defines a bore 119 and an external surface 120 that is substantially coaxial with the internal surface 118. The internal surface 118 may include threads 116 along its entire axial length. The external surface 120 may include a generally uniform and smooth portion that may extend along all or substantially all of its axial length. The threaded insert 106 can also include a flange 122 extending radially outward from an end of the body 107. As seen in FIG. 1, the threaded insert 106 may be secured inside the bore 104 where the external surface 120 is adjacent an internal surface 140 of the injector arm 102. In one embodiment the threaded insert 106 may be press fit into the bore 104 so that the external surface 120 is in intimate engagement with internal surface 140 to secure the threaded insert in place.

The adjusting screw 108 can be seen in FIGS. 1 and 2. The adjusting screw 108 can be secured within the threaded insert 106. In an embodiment, the adjusting screw 108 includes threads 124 extending along all or a portion of the axial length of an external surface 126 of the adjusting screw 108. The threads 124 of the adjusting screw 108 can cooperate with the threads 116 of the threaded insert 106 to secure the adjusting screw 108 within the threaded insert 106.

The jam nut 110 can also be seen in FIGS. 1 and 2. In an embodiment, the jam nut 110 includes threads 128 on an internal surface 130 that defines a bore 131 extending axially therethrough. The jam nut 110 can be coupled with the adjusting screw 108 using the threads 128. For example, the threads 128 of the jam nut 110 can cooperate with the threads 124 of the adjusting screw 108 to couple the jam nut 110 with the adjusting screw 108.

The adjusting screw 108 may be held in place, by inserting a tool into a slot 144 of the adjusting screw 108 as shown in FIGS. 1 and 2. The tool can be, for example, a screwdriver, a hex key, or other device which can be inserted into the slot 144 to prevent rotational movement of the adjusting screw 108. As the jam nut 110 is tightened against the injector arm 102, the adjusting screw 108 may move in an axial direction relative to the bore 104. Movement of the adjusting screw 108 caused by rotation of the jam nut 110 may cause the threaded insert 106 to move axially relative to the bore 104. However, the threaded insert 106 will encounter resistance in a first axial direction, as depicted in FIG. 2, as the flange 122 contacts the injector arm 102. Furthermore, resistance in a second axial direction opposite the first axial direction will be supplied by the jam nut 110 as it contacts the injector arm 102. Thus, axial movement of the threaded insert 106 can be prevented in both the first axial direction and the second axial direction relative to the bore 104. Therefore, the jam nut 110, adjusting screw 108, and the flange 122 can prevent axial movement of threaded insert 106.

In an assembled state of the rocker arm 100, a radial gap 112 may extend circumferentially around the adjusting screw 108 as shown in FIG. 2. The gap 112 can be defined by the threaded insert 106 at a bottom portion of the gap 112, the jam nut 110 at an upper portion of the gap 112, the adjusting screw 108 at a radially inner portion of the gap 112 and the injector arm 102 at a radially outer portion of the gap 112. The gap 112 can therefore be annular or substantially annular in shape.

The injector arm 102 may also include a first oil path 132, the adjusting screw 108 may include a second oil path 134, and the button may include a third oil path 136. In an embodiment, lubricating oil can flow from the first oil path 132 to the gap 112. From the gap 112, the oil can flow through the second oil path 134 and the third oil path 136. The oil can then flow from the third oil path 136 to the valve of the engine.

INDUSTRIAL APPLICABILITY

Figure 4:
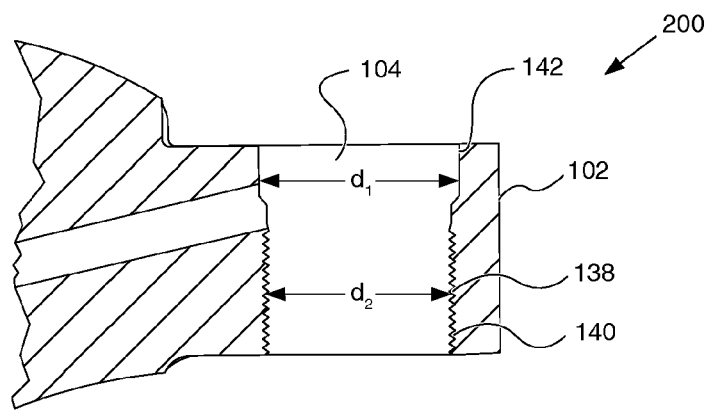
FIG. 4 depicts a partial sectional view of a rocker arm prior to smoothing out a bore according to an embodiment.

As seen in FIG. 4, the bore 104 of a rocker arm 200 may include a smooth portion 142, and a threaded portion 138 along the internal surface 140 of the injector arm 102. The smooth portion 142 may include a diameter d1, while the threads 138 may include a diameter d2. In an embodiment, the diameter d1 is greater than the diameter d2. The diameter d2 can be selected based on a diameter of the adjusting screw 108 or the threads 116 of the adjusting screw 108.

In a first life of the rocker arm 200 the threads 138 may be utilized in place of the threaded insert 106. Thus, the adjusting screw 108 would be secured within the bore 104 via the threads 138 of the injector arm 102.

Figure 7:
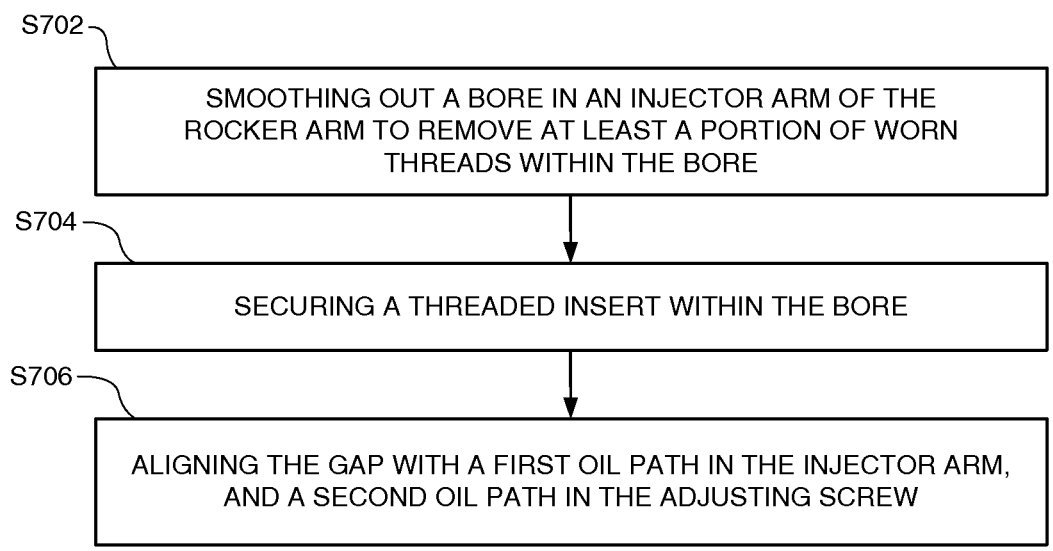
FIG. 7 depicts a process for repairing a rocker arm according to an embodiment.

However, over time, the threads 138 of the injector arm 102 may become worn out. In such a case, the rocker arm 200 may be repaired using a threaded insert 106, as discussed above, to create a repaired rocker arm 100 as described above. For example, FIG. 7 depicts a process for repairing the rocker arm 100.

Figure 5:
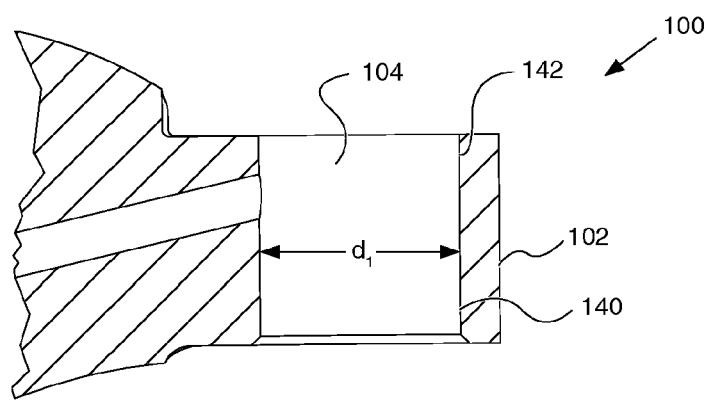
FIG. 5 depicts a partial sectional view of a rocker arm with a smoothed out bore according to an embodiment.

In block S702, the bore 104 can be smoothed out to remove at least a portion of worn threads 138 within the bore 104. For example, some or all of the threads 138 can be removed from the bore 104. As shown in FIG. 5, the result can be an extension of the smooth portion 142 within the bore 104 to all or most of the internal surface 140. The smooth portion 142 within the bore 104 can be sized to allow for the insertion of the threaded insert 106.

Figure 6:
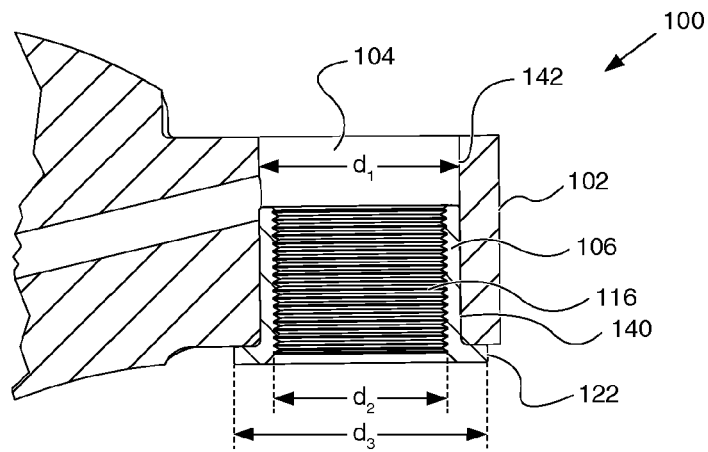
FIG. 6 depicts a partial sectional view of a rocker arm with a threaded insert according to an embodiment.

In block S704, the threaded insert 106 can be secured within the bore 104. For example, as shown in FIG. 6, the threaded insert 106 can be press fit within the bore 104. As seen in FIG. 6, the threaded insert 106 may include an external diameter similar to that of the smooth portion 142. Thus, the threaded insert 106 may include an external diameter of approximately d1. The threaded insert 106 may also include an internal diameter of approximately d2. That is, the threads 116 of the threaded insert 106 would have an internal diameter similar to that of the threads 138.

As previously noted, the flange 122, the adjusting screw 108, and the jam nut 110 can aid in securing the threaded insert 106 and also in preventing vertical movement of the threaded insert 106 relative to the bore 104. As can be seen in FIG. 6, the flange 122 may include a diameter d3, which is larger than diameters d1 and d2. This allows the flange 122 to contact the injector arm 102 and prevent the threaded insert 106 from completely entering the bore 104.

Optionally, in block S706, the gap 112 can be aligned with the first oil path 132 and the second oil path 134. For example, the adjusting screw 108, the threaded insert 106, or any combination thereof can be adjusted so that the gap 112, the first oil path 132, and the second oil path 134 are aligned to allow oil to flow from the first oil path 132 to the second oil path 134. In an embodiment, the second oil path 134 need not be directly facing the first oil path 132. Instead, alignment can occur when the first oil path 132, the gap 112, and the second oil path 134 are communicably connected to each other to allow fluid flow.

By repairing the rocker arm 200 to form a repaired rocker arm 100, a life of the rocker arm 200 can be extended. This can reduce a necessity for complete replacement of the rocker arm 200 and decrease an overall maintenance cost of the machine.

Figure 8:
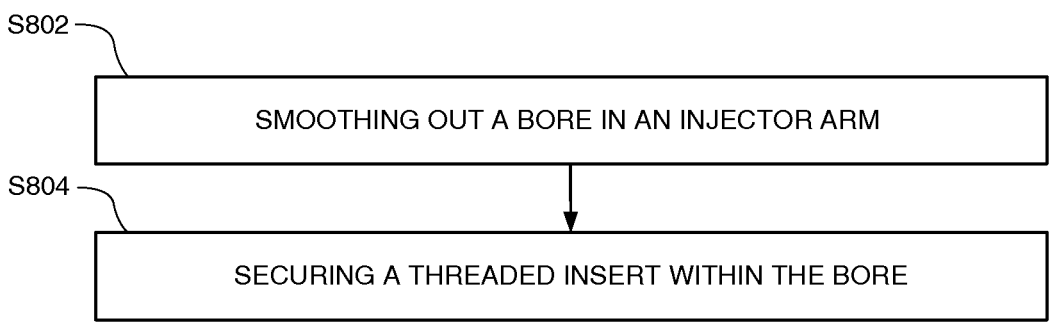
FIG. 8 depicts a process for making a rocker arm according to an embodiment.

In an embodiment, the rocker arm 100 need not be manufactured with the threads 138 in the bore 104 as shown in FIG. 4. Instead, the rocker arm 100 can be manufactured without the threads 138 and just the smooth portion 142 as shown in FIG. 5. In such a case, a process for making a rocker arm 100 can be utilized as shown in FIG. 8.

In block S802, the bore 104 in the rocker arm 100 can be smoothed out as seen in FIG. 5. During the smooth out process, the bore 104 can be smoothed to fit the threaded insert 106. In block S804, the threaded insert 106 can be secured within the bore 104 similar to the process disclosed in block S704 and FIG. 6.

In an embodiment, when the threads 116 of the threaded insert 106 is worn out, or the threaded insert 106 is otherwise worn out, the threaded insert 106 can be removed and replaced. This can allow for a low-cost and easy repair or remanufacturing of the rocker arm 100.

It will be apparent to those skilled in the art that various modifications and variations can be made to the disclosed system and method. Other embodiments will be apparent to those skilled in the art from consideration of the specification and practice of the disclosed system and method. It is intended that the specification and examples be considered as exemplary only, with a true scope being indicated by the following claims.

What is claimed is:

1. A method for repairing a rocker arm comprising:
   smoothing out a bore in an injector arm of the rocker arm to remove at least a portion of worn threads within the bore;
   securing a threaded insert within the bore, wherein the threaded insert comprises threads on an internal surface of the threaded insert, a smooth portion on an external surface of the threaded insert, and a flange on an end of the threaded insert, and wherein the internal surface and the external surface are formed on a continuous cylindrical wall that extends circumferentially around a longitudinal axis of the threaded insert, and the flange extends radially outward from the cylindrical wall;

securing an adjusting screw within the threaded insert, wherein the adjusting screw comprises threads on an external surface of the adjusting screw;

coupling a jam nut with the adjusting screw; and tightening the jam nut, such that movement of the adjusting screw within the bore in a first axial direction is prevented by contact between the jam nut and a first side of the injector arm, and movement of the adjusting screw within the bore in a second axial direction is prevented by contact between the flange and a second side of the injector arm.

2. The method of claim 1 further comprising connecting a button to the rocker arm.

3. The method of claim 2, wherein vertical movement of the threaded insert relative to the bore is prevented by at least the flange.

4. The method of claim 3, wherein the vertical movement of the threaded insert relative to the bore is prevented by at least the adjusting screw and the jam nut.

5. The method of claim 1 further comprising providing a gap in the bore defined by the threaded insert at a bottom portion of the gap, the jam nut at an upper portion of the gap, the adjusting screw at an inner portion of the gap, and the injector arm at an outer portion of the gap.

6. The method of claim 5 further comprising aligning the gap with a first oil path in the injector arm, and a second oil path in the adjusting screw.

7. A repaired rocker arm comprising:
a used injector arm removed from service, and defining a bore having a smooth surface; and
a threaded insert located within the bore, wherein the threaded insert comprises threads on an internal surface of the threaded insert, a smooth portion on an external surface of the threaded insert, and a flange on an end of the threaded insert, and the threaded insert further comprising a continuous cylindrical wall that extends circumferentially around a longitudinal axis of the threaded insert, and wherein the continuous cylindrical wall includes the internal surface and the external surface, and the flange extends radially outward from the continuous cylindrical wall;

an adjusting screw secured within the threaded insert, wherein the adjusting screw comprises threads on an external surface of the adjusting screw; and a jam nut coupled with the adjusting screw;

wherein vertical movement of the threaded insert relative to the bore is prevented by the flange, the adjusting screw, and the jam nut.

8. The rocker arm of claim 7 further comprising a gap in the bore defined by the threaded insert at a bottom portion of the gap, the jam nut at an upper portion of the gap, the adjusting screw at an inner portion of the gap, and the injector arm at an outer portion of the gap.

9. The rocker arm of claim 8 wherein the gap is aligned with a first oil path in the injector arm, and a second oil path in the adjusting screw.

10. A method for making a rocker arm comprising:
smoothing out a bore in a used injector arm removed from service; and
securing a threaded insert within the bore, wherein the threaded insert comprises threads on an internal surface of the threaded insert, a smooth portion on an external surface of the threaded insert, and a flange on an end of the threaded insert, and wherein the internal surface and the external surface are formed on a continuous cylindrical wall that extends circumferentially around a longitudinal axis of the threaded insert, and the flange extends radially outward from the cylindrical wall;

securing an adjusting screw within the threaded insert, wherein the adjusting screw comprises threads on an external surface of the adjusting screw;

coupling a jam nut with the adjusting screw; and tightening the jam nut, such that movement of the adjusting screw within the bore in a first axial direction is prevented by contact between the jam nut and a first side of the injector arm, and movement of the adjusting screw within the bore in a second axial direction is prevented by contact between the flange and a second side of the injector arm.

11. The method of claim 10 further comprising connecting a button to the rocker arm.

12. The method of claim 10, wherein vertical movement of the threaded insert relative to the bore is prevented by at least the flange, the adjusting screw, and the jam nut.

* * * * *